US012775510B2

(12) United States Patent
Chen et al.

(10) Patent No.: US 12,775,510 B2
(45) Date of Patent: Oct. 27, 2026

(54) DATA INFORMATION PUSHING METHOD AND APPARATUS BASED ON INTERNET OF THINGS PLATFORM, AND DEVICE AND MEDIUM

(71) Applicant: E SURFING IOT CO., LTD., Guangzhou (CN)

(72) Inventors: Yang Chen, Guangzhou (CN); JiaYang Dong, Guangzhou (CN); JinTao Sun, Guangzhou (CN); Wei Han, Guangzhou (CN); Yuan Liu, Guangzhou (CN); Tingting Li, Guangzhou (CN)

(73) Assignee: E SURFING IOT CO., LTD., Guangzhou (CN)

( * ) Notice: Subject to any disclaimer, the term of this patent is extended or adjusted under 35 U.S.C. 154(b) by 339 days.

(21) Appl. No.: 18/723,449

(22) PCT Filed: Dec. 20, 2022

(86) PCT No.: PCT/CN2022/140391

§ 371 (c)(1),
(2) Date: Aug. 7, 2024

(87) PCT Pub. No.: WO2023/116701

PCT Pub. Date: Jun. 29, 2023

(65) Prior Publication Data

US 2025/0061012 A1 Feb. 20, 2025

(30) Foreign Application Priority Data

Dec. 23, 2021 (CN) ......................... 202111588047.0

(51) Int. Cl.
*G06F 9/54* (2006.01)

(52) U.S. Cl.
CPC .................................... *G06F 9/546* (2013.01)

(58) Field of Classification Search
None
See application file for complete search history.

(56) References Cited

U.S. PATENT DOCUMENTS 5,878,056 A 3/1999 Black et al.
7,516,323 B2 * 4/2009 Inoue ...................... G06F 21/57 718/100

(Continued)

FOREIGN PATENT DOCUMENTS

CN 103856392 A 6/2014
CN 111371854 A 7/2020

(Continued)

OTHER PUBLICATIONS

Pan et al.; "Intelligent Push Notification for Converged Mobile Computing and Internet of Things"; 2015 IEEE international conference on web services; DOI: 10.1109/ICWS.2015.92; (NPL: Pan_2015.pdf) (Year: 2015).*

(Continued)

*Primary Examiner* — Hiren P Patel
(74) *Attorney, Agent, or Firm* — Quarles & Brady LLP

(57) ABSTRACT

A data information pushing method based on an Internet of Things platform includes configuring an application pushing message according to an application address list and data information to be pushed that comes from an Internet of Things terminal and adding the application pushing message into a normal queue for message pushing. If the message pushing fails, the method includes adding the application pushing message that fails to be pushed into a failure queue for retry pushing. The method further includes adding an application address of the application pushing message that fails to be pushed into a blacklist and if the message pushing (Continued)

succeeds, removing an application address of the application pushing message that is pushed successfully from the blacklist.

6 Claims, 7 Drawing Sheets

(56) References Cited

U.S. PATENT DOCUMENTS

| | | | | |
|---|---|---|---|---|
| 9,436,532 | B1 * | 9/2016 | Chandrasekaran | G06F 9/546 |
| 10,218,656 | B2 * | 2/2019 | Fang | H04L 51/212 |
| 10,701,145 | B1 * | 6/2020 | Islam | G06F 9/546 |
| 2005/0015625 | A1 * | 1/2005 | Inoue | G06F 21/57 712/203 |
| 2006/0259545 | A1 * | 11/2006 | Garza | G06F 11/0709 709/203 |
| 2007/0204275 | A1 * | 8/2007 | Alshab | G06F 9/546 719/313 |
| 2008/0229329 | A1 * | 9/2008 | Ayres | G06F 9/546 719/314 |
| 2009/0262662 | A1 * | 10/2009 | Ramachandran | H04W 24/04 370/254 |
| 2014/0189442 | A1 * | 7/2014 | DeGraaf | H04L 51/212 714/48 |
| 2017/0264579 | A1 | 9/2017 | Fang et al. | |
| 2018/0375783 | A1 * | 12/2018 | Katkov | H04L 47/626 |
| 2020/0196213 | A1 * | 6/2020 | Cheng | H04L 47/10 |
| 2020/0242043 | A1 * | 7/2020 | Yang | G06F 12/0284 |
| 2022/0206847 | A1 * | 6/2022 | Mosto | G06F 9/4881 |

FOREIGN PATENT DOCUMENTS

| | | |
|---|---|---|
| CN | 112559219 A | 3/2021 |
| CN | 112751743 A | 5/2021 |
| CN | 112948174 A | 6/2021 |
| CN | 114265693 A | 4/2022 |

OTHER PUBLICATIONS

Ferrari et al.; "Delay Estimation of Industrial IoT Applications Based on Messaging Protocols"; IEEE Transactions on Instrumentation and Measurement, vol. 67, No. 9, Sep. 2018; (NPL: Ferrari_2018.pdf) (Year: 2018).*

International Search Report and Written Opinion for PCT Application No. PCTCN2022140391 and English translation, mailed Feb. 23, 2023.

First Search Report for Chinese family patent No. 2021115880470, issued on Apr. 16, 2025 and English translation.

First Office Action for Chinese family patent No. 2021115880470, issued on Apr. 18, 2025 and English translation.

Second Office Action for Chinese family patent No. 2021115880470, issued on Jul. 31, 2025 and English translation.

Decision of Rejection for Chinese family patent No. 2021115880470, issued on Aug. 28, 2025 and English translation.

* cited by examiner

DATA INFORMATION PUSHING METHOD AND APPARATUS BASED ON INTERNET OF THINGS PLATFORM, AND DEVICE AND MEDIUM

CROSS-REFERENCE TO RELATED APPLICATIONS

This application is a national stage filing under 35 U.S.C. § 371 of international application number PCT/CN2022/140391, filed on Dec. 20, 2022, which claims priority to Chinese patent application No. 202111588047.0 filed on Dec. 23, 2021. The contents of these applications are incorporated herein by reference in their entirety.

TECHNICAL FIELD

The present disclosure relates to the technical field of Internet of Things, in particular to a data information pushing method and apparatus based on an Internet of Things platform, a device and a medium.

BACKGROUND

An Internet of Things device connection management platform may access a plurality of Internet of Things terminals, and then the Internet of Things device connection management platform can provide device access management and data information pushing services for the Internet of Things terminals. The Internet of Things device connection management platform provides device data access management capabilities for many enterprise customers. An Internet of Things device reports data information to the platform, and the platform pushes the data information reported by the device to an SaaS application platform built by the enterprise customers, so that the data information can be further analyzed, logically processed and displayed through the application platform. As an intermediate data access and data forwarding platform, the Internet of Things device connection management platform needs high reliability for device data access and forwarding. Especially in a data forwarding scenario, the Internet of Things platform needs to push the data information reported by different Internet of Things terminals to different SaaS application platforms at the same time, that is, one-to-many data forwarding. This mode requires high reliability in data pushing. Especially in abnormal scenarios, if the data pushing of one enterprise customer fails due to network problems or application platform failure, the platform will attempt to resend the data within a short period. This process will occupy a lot of system resources, which will affect the normal business pushing and lead to a decline in the overall efficiency of pushing data information. Therefore, the data information pushing method in the existing technology has the problem of occupying high system resource.

SUMMARY

The embodiments of the present disclosure provide a data information pushing method and apparatus based on an Internet of Things platform, a device, and a medium, to solve a problem that excessive system resources are occupied by the data information pushing method in the existing technology.

According to a first aspect, the embodiments of the present disclosure provide a data information pushing method based on an Internet of Things platform, wherein the method is applied to a management server establishing a network connection with an Internet of Things terminal and a plurality of application terminals to realize wireless transmission of data information, and each of the plurality of application terminals corresponds to a respective one of application addresses, wherein the method comprises:

in response to data information to be pushed from the Internet of Things terminal being received, configuring an application pushing message corresponding to the data information to be pushed according to a pre-stored application address list;

adding the application pushing message to a preset normal queue for message pushing, and acquiring a pushing result of each application pushing message;

in response to the pushing result of the application pushing message indicating a failed pushing, adding the application pushing message that fails to be pushed into a preset failure queue for retry pushing;

adding an application address of the application pushing message that fails to be pushed into a preset blacklist; and in response to the pushing result of the application pushing message indicating a successful pushing, removing the application address of the application pushing message that is pushed successfully from the blacklist.

According to a second aspect, the embodiments of the present disclosure provide a data information pushing apparatus based on an Internet of Things platform, wherein the apparatus is applied to a management server establishing a network connection with an Internet of Things terminal and a plurality of application terminals to realize wireless transmission of data information, and each of the plurality of application terminals corresponds to a respective one of application addresses, wherein the apparatus comprises:

an application pushing message configuration unit configured for, in response to data information to be pushed from the Internet of Things terminal being received, configuring an application pushing message corresponding to the data information to be pushed according to a pre-stored application address list;

a pushing result acquisition unit configured for adding the application pushing message to a preset normal queue for message pushing, and acquiring a pushing result of each application pushing message;

a retry pushing unit configured for, in response to the pushing result of the application pushing message indicating a failed pushing, adding the application pushing message that fails to be pushed into a preset failure queue for retry pushing;

an application address adding unit configured for adding an application address of the application pushing message that fails to be pushed into a preset blacklist; and an application address removing unit configured for, in response to the pushing result of the application pushing message indicating a successful pushing, removing the application address of the application pushing message that is pushed successfully from the blacklist.

According to a third aspect, the embodiments of the present disclosure further provide a computer device, comprising a memory, a processor, and a computer program stored in the memory and executable on the processor, wherein the computer program, when executed by the processor, causes the processor to implement the data information pushing method based on an Internet of Things platform according to the first aspect.

According to a fourth aspect, the embodiments of the present disclosure further provide a computer-readable storage medium, wherein the computer-readable storage medium stores a computer program which, when executed by a processor, causes the processor to implement the data information pushing method based on an Internet of Things platform according to the first aspect.

The embodiments of the present disclosure provide the data information pushing method and apparatus based on the Internet of Things platform, the device and the medium. The application pushing message is configured according to the application address list and the data information to be pushed that comes from the Internet of Things terminal, and the application pushing message is added into the normal queue for message pushing. If the pushing result of the message pushing indicates a failed pushing, the application pushing message that fails to be pushed is added into the failure queue for retry pushing, and the application address of the application pushing message that fails to be pushed is added into the blacklist. If the pushing result of the message pushing indicates a successful pushing, the application address of the application pushing message that is pushed successfully is removed from the blacklist. Through the method above, the normal queue and the failure queue may be configured to separately pushing application pushing messages for normal and abnormal application addresses, avoiding disruption to the normal pushing process by the abnormal application addresses. The lifespan is configured to control a retry pushing frequency for the application pushing messages in the failure queue, avoiding excessive retry pushing in a short period of time, which greatly reduces occupation of system resources.

BRIEF DESCRIPTION OF THE DRAWINGS

In order to illustrate the technical solutions in the embodiments of the present disclosure more clearly, the drawings used in the description of the embodiments will be briefly described below. Obviously, the drawings in the following description are merely some embodiments of the present disclosure. For those of ordinary skills in the art, other drawings may also be obtained based on these drawings without going through any creative work.

DETAILED DESCRIPTION

The following clearly and completely describes the technical solutions in the embodiments of the present disclosure with reference to the drawings in the embodiments of the present disclosure. Apparently, the described embodiments are merely some but not all of the embodiments of the present disclosure. Based on the embodiments of the present disclosure, all other embodiments obtained by those of ordinary skills in the art without going through any creative work shall fall within the protection scope of the present disclosure.

It should be understood that the terms "comprising" and "including" used in the specification and the claims of the present disclosure indicate the presence of described features, integers, steps, operations, elements and/or components, but do not exclude the presence or addition of one or more other features, integers, steps, operations, elements, components and/or combinations thereof.

It should also be noted that the terms used in the specification of the present disclosure are for the purpose of describing specific embodiments only and are not intended to limit the present disclosure. As used in the specification and the appended claims of the present disclosure, unless the context clearly dictates otherwise, the singular forms "a", "an", and "the" are intended to include the plural forms.

It should be further understood that the term "and/or" used in the specification and the appended claims of the present disclosure refers to any combination and all possible combinations of one or more of the associated listed items, and includes these combinations.

Figure 1:
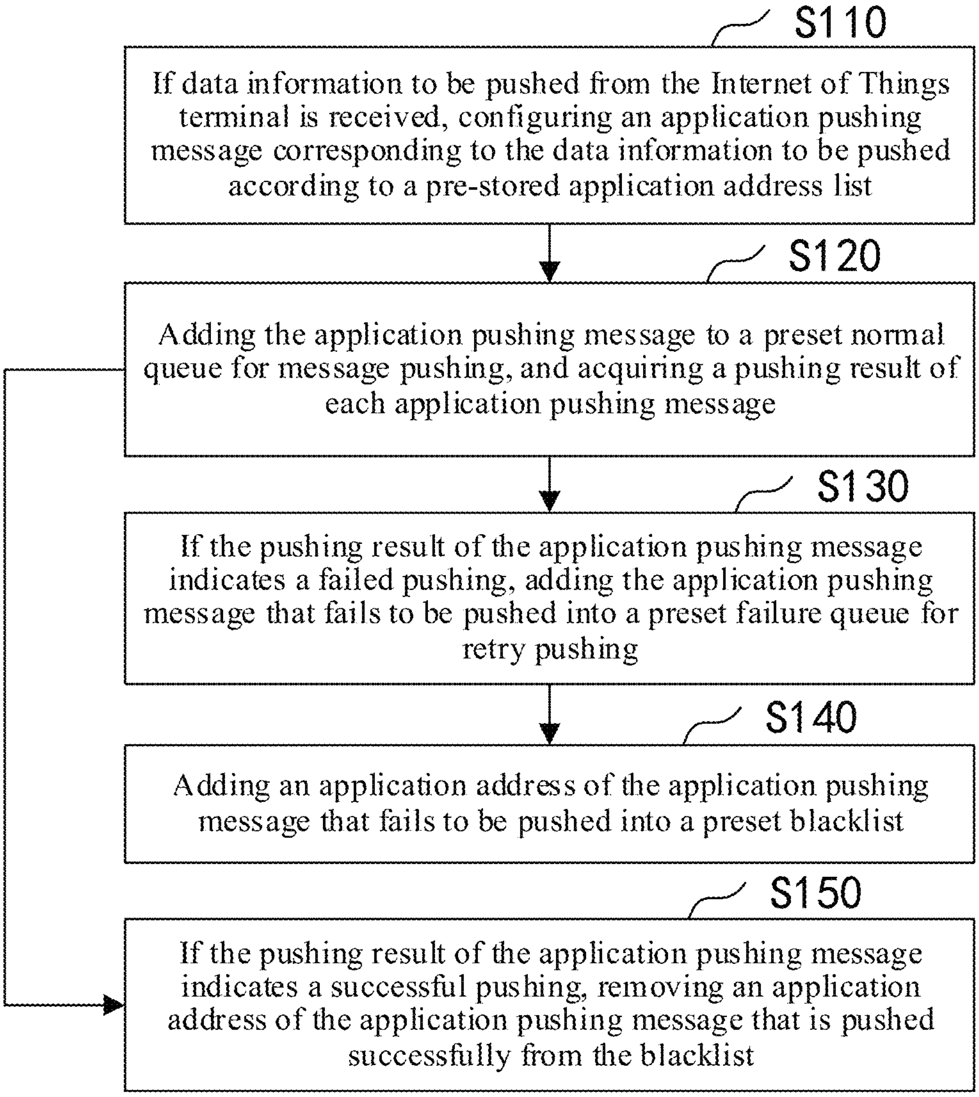
FIG. 1 is a flowchart of a data information pushing method based on an Internet of Things platform provided by the embodiments of the present disclosure.
Figure 2:
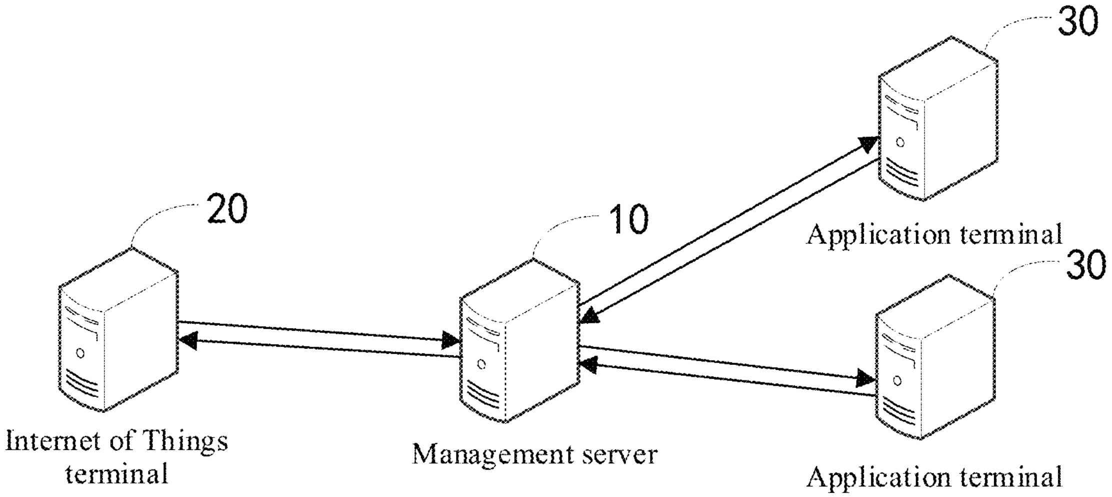
FIG. 2 is a schematic diagram of an application scenario of the data information pushing method based on an Internet of Things platform provided by the embodiments of the present disclosure.

Referring to FIG. 1 and FIG. 2, FIG. 1 is a flowchart of a data information pushing method based on an Internet of Things platform provided by the embodiments of the present disclosure. FIG. 2 is a schematic diagram of an application scenario of the data information pushing method based on an Internet of Things platform provided by the embodiments of the present disclosure. The data information pushing method based on an Internet of Things platform is applied to a management server 10. The management server 10 establishes network connection with an Internet of Things terminal 20 and a plurality of application terminals 30 to realize wireless transmission of data information. Each application terminal corresponds to one application address, and the data information pushing method based on an Internet of Things platform is executed by application software installed in the management server 10. The management server 10 may receive a message to be pushed from the Internet of Things terminal 20, and push the message to be pushed to the corresponding application terminal 30. The Internet of Things device 20 is a terminal device for an enterprise customer to use and transmit data with the management server 10, for example a terminal device such as a notebook computer, a tablet computer, a mobile phone, a smart watch, or a smart home appliance such as a smart voice speaker and a smart refrigerator. The application terminal 30 is a terminal device to which the customer belongs. The application terminal 30 may be used to configure corresponding applications to perform data analysis, logical processing, presentation and other processing on the data information. For example, an SaaS application platform may be configured in the application terminal 30. As shown in FIG. 1, the method may include steps S110 to S150.

In S110, if data information to be pushed from the Internet of Things terminal is received, an application pushing message corresponding to the data information to be pushed is configured according to a pre-stored application address list.

If the data information to be pushed from the Internet of Things terminal is received, the application pushing message corresponding to the data information to be pushed is configured according to the pre-stored application address list. The Internet of Things terminal may send the data information to be pushed to the management server. In this embodiment, only one Internet of Things terminal sends the data information to be pushed to the management server. In an actual application process, the management server can simultaneously receive the data information to be pushed from a plurality of Internet of Things terminals and push the data information to be pushed separately. If the management server receives the data information to be pushed from the Internet of Things terminal, the corresponding application pushing message may be configured according to the application address list corresponding to the Internet of Things terminal. Specifically, different Internet of Things terminals may correspond to different application terminals, so a corresponding relationship between one Internet of Things terminal and the corresponding application terminal can be recorded through the application address list, and the application address list corresponding to each Internet of Things terminal is stored in the management server. After receiving the data information to be pushed from a certain Internet of Things terminal, the application address list corresponding to the Internet of Things terminal can be acquired. A plurality of application addresses are stored in the application address list corresponding to the Internet of Things terminal, and the application addresses may be Internet IP addresses, so corresponding application pushing messages can be configured and generated according to each application address, and a number of generated application pushing messages is equal to a number of the application addresses contained in the application address list.

In S120, the application pushing message is added to a preset normal queue for message pushing, and a pushing result of each application pushing message is acquired.

The application pushing message is added to the preset normal queue for message pushing, and the pushing result of each application pushing message is acquired. The management server is configured with the normal queue, that is, a message queue in which the application pushing messages are normally pushed, and the configured application pushing message may be added to the normal queue. The normal queue follows a first-in-first-out principle, that is, after the application pushing messages are added to the normal queue, the messages are pushed to the corresponding application terminals in the order they were added, and each application pushing message is configured with a corresponding application address, so that the application pushing messages can be pushed to the application terminals corresponding to the application addresses according to the application addresses in the application pushing message. The normal queue may push the application pushing message based on a pushing service, which acquires the application pushing message from the normal queue (or the failure queue), initiates a TCP connection request to the corresponding application terminal, and pushes the application pushing message through a protocol such as http/mqtt.

Figure 3:
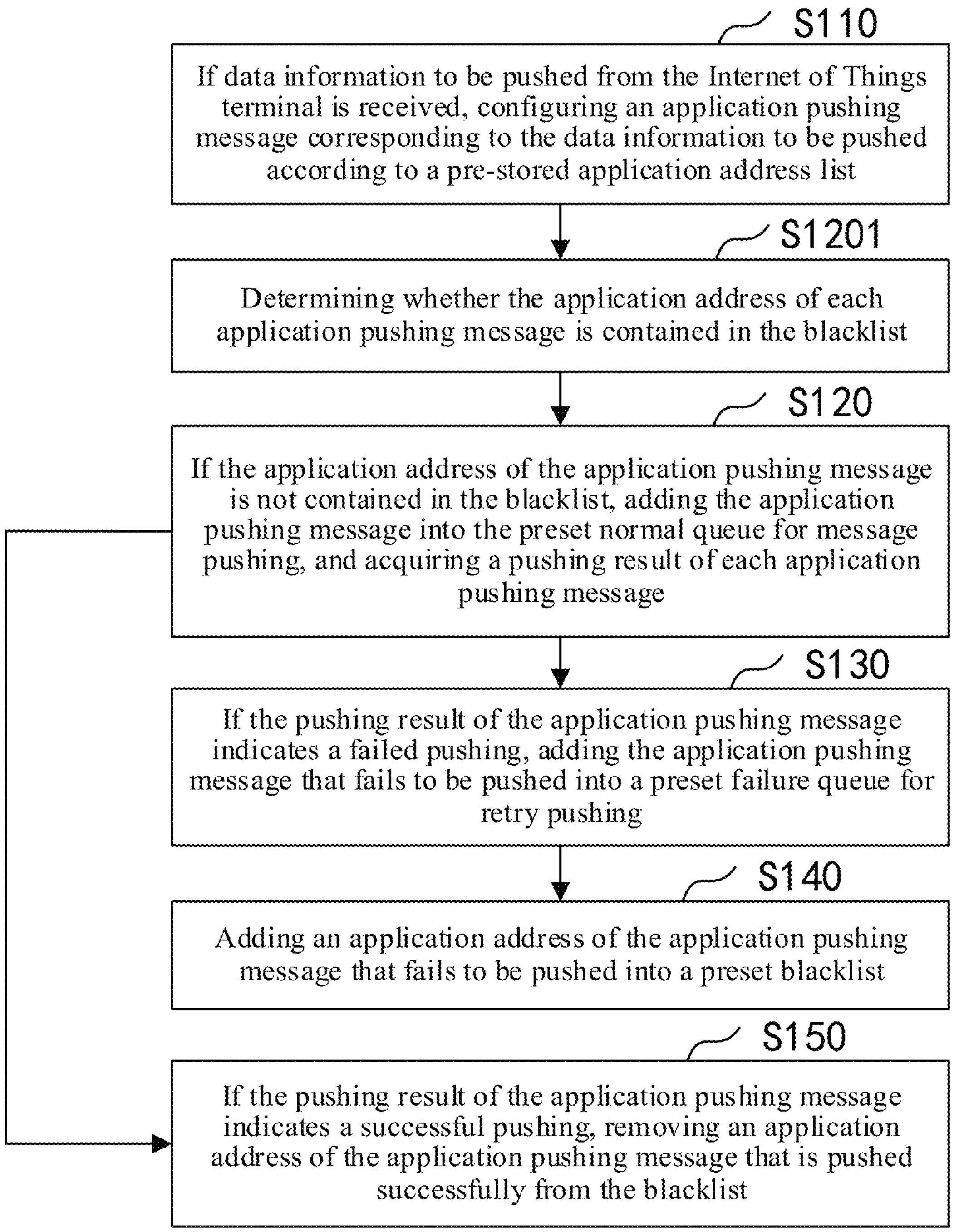
FIG. 3 is another flowchart of the data information pushing method based on an Internet of Things platform provided by the embodiments of the present disclosure.

In an embodiment, as shown in FIG. 3, before the step S120, the method further comprises step S1201.

In S1201, it is determined whether the application address of each application pushing message is contained in the blacklist; and if the application address of the application pushing message is not contained in the blacklist, the step of adding the application pushing message into the preset normal queue for message pushing is executed.

Specifically, before adding the configured application pushing message to the normal queue, it is also possible to first determine whether the application address of the application pushing message is contained in the blacklist. The blacklist is a list pre-configured in the management server for storing the abnormal application addresses. If the application address of the application pushing message is not contained in the blacklist, the subsequent steps are executed to add the application pushing message into the normal queue and push the message. If the application address of the application pushing message is contained in the blacklist, the application pushing message cannot be directly added into the normal queue.

Figure 4:
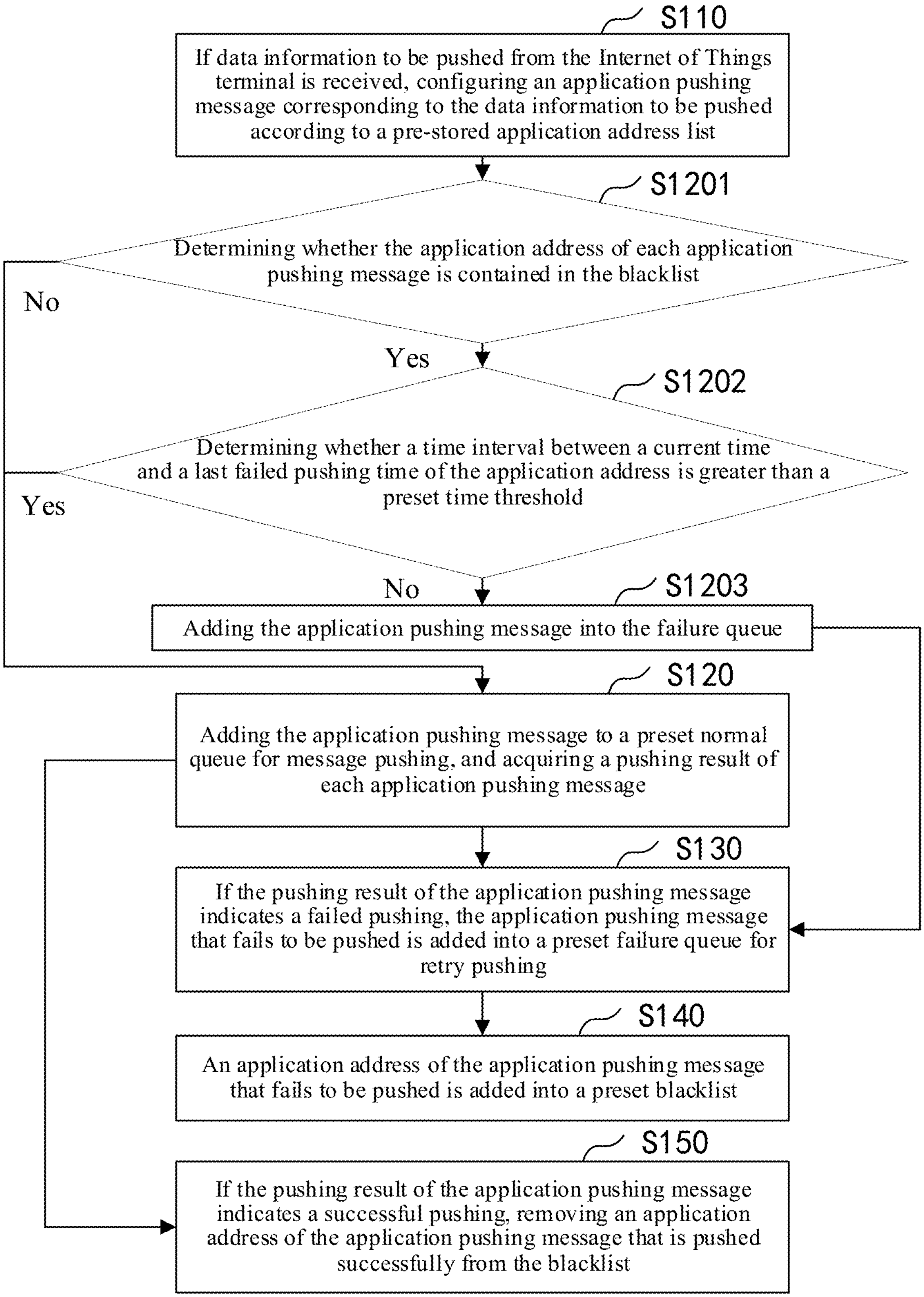
FIG. 4 is a sub-flowchart of the data information pushing method based on an Internet of Things platform provided by the embodiments of the present disclosure.

In an embodiment, as shown in FIG. 4, after the step S1201, the method further comprises steps S1202 and S1203.

In S1202, if the application address of the application pushing message is contained in the blacklist, it is determined whether a time interval between a current time and a last failed pushing time of the application address is greater than a preset time threshold, wherein the last failed pushing time is the most recent time when pushing of the application pushing message to the application address fails; and if the time interval between the current time and the last failed pushing time is greater than the time threshold, the step of adding the application pushing message into the preset normal queue for message pushing is executed.

If the application address of the application pushing message is contained in the blacklist, the time interval between the current time and the last failed pushing time of the application address can be acquired, and it is determined whether the time interval is greater than the time threshold. If the application address is contained in the blacklist, there must be other application pushing messages failing to be pushed successfully before the application address, and the last failed pushing time is the most recent time when pushing of the application pushing message to the application address fails. The time threshold may be pre-configured by an administrator of the management server. If it is detected that the time interval is greater than the time threshold, the subsequent steps are executed to add the application pushing message into the normal queue for message pushing.

For example, the time threshold may be configured as 8 minutes, if the time interval for a certain application pushing message is more than 8 minutes, the application pushing message is added into the normal queue.

In S1203, if the time interval between the current time and the last failed pushing time is no more than the time threshold, the application pushing message is added into the failure queue.

If the time interval between the current time and the last failed pushing time is no more than the time threshold, it indicates that there is still a high probability that the application pushing message cannot be pushed successfully, and the application pushing message may be added into the failure queue for subsequent processing.

In S130, if the pushing result of the application pushing message indicates a failed pushing, the application pushing message that fails to be pushed is added into a preset failure queue for retry pushing, wherein each application pushing message added into the failure queue is configured with a lifespan.

If the pushing result of the application pushing message indicates a failed pushing, the application pushing message that fails to be pushed is added into the preset failure queue for retry pushing, wherein each application pushing message added into the failure queue is configured with the lifespan. If the pushing result of the application pushing message indicates a failed pushing, the application pushing message that fails to be pushed is added into the failure queue. The failure queue is also configured in the management server.

The failure queue is a message queue that performs retry pushing on the application pushing message that cannot be pushed normally. The failure queue also follows the first-in and first-out principle. After the application pushing message is added to the failure queue, retry pushing may be performed for multiple times, and each application pushing message is configured with a corresponding application address, so that the application pushing message can be re-pushed to the application terminal corresponding to the application address according to the application address in each application pushing message. Each application pushing message added into the failure queue is also configured with a lifespan. The lifespan restricts the duration for the application pushing message to remain in the failure queue, that is, a retry pushing frequency of the application pushing message in the failure queue is controlled by configuring the lifespan.

Figure 5:
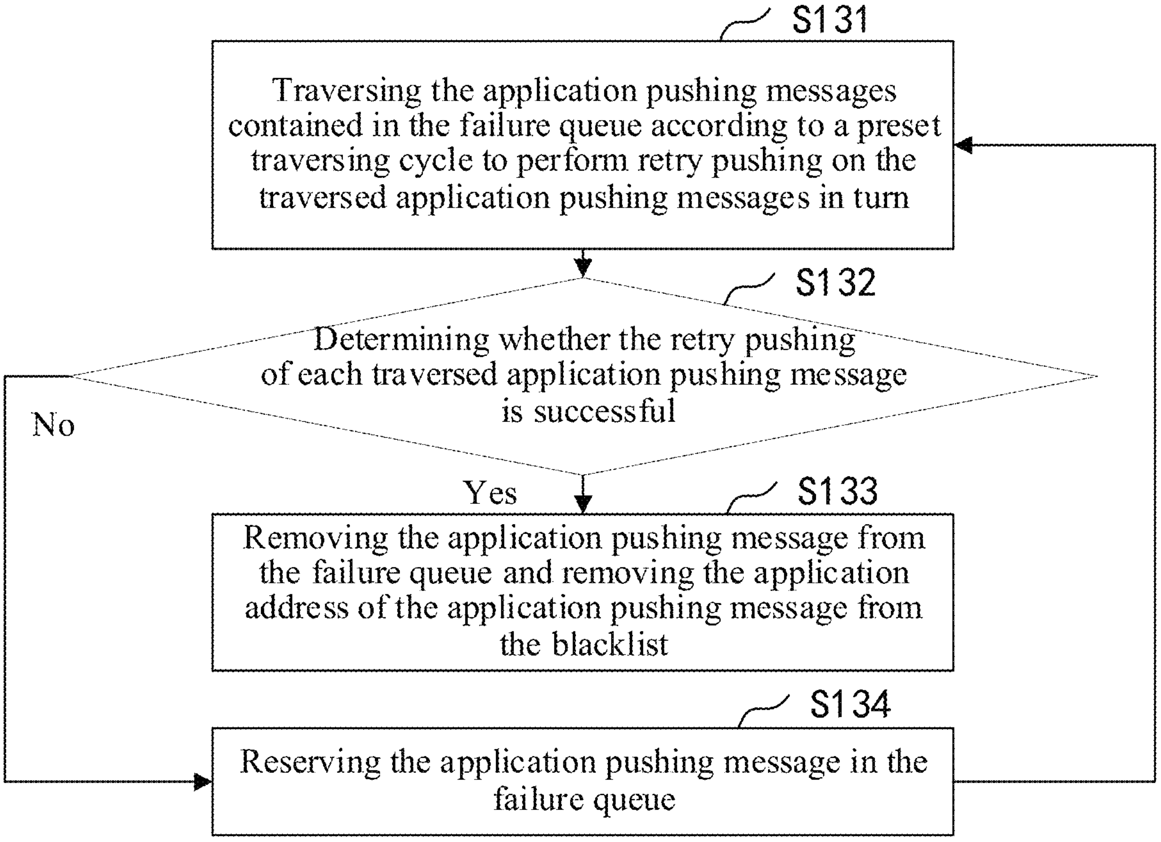
FIG. 5 is another sub-flowchart of the data information pushing method based on an Internet of Things platform provided by the embodiments of the present disclosure.
Figure 6:
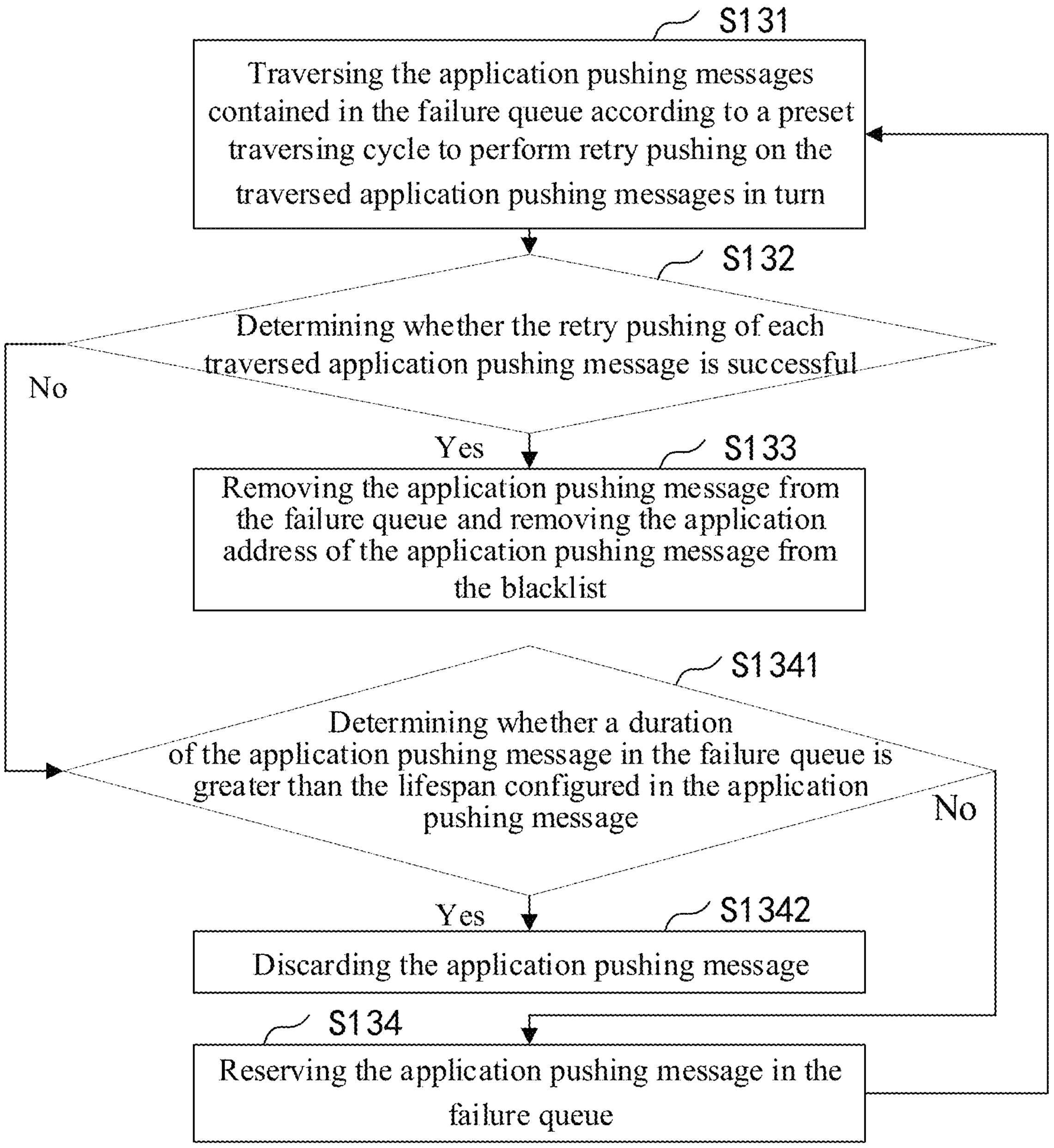
FIG. 6 is another sub-flowchart of the data information pushing method based on an Internet of Things platform provided by the embodiments of the present disclosure.

In an embodiment, as shown in FIG. 5, the step S130 comprises sub-steps S131, S132, S133 and S134.

In S131, the application pushing messages contained in the failure queue are traversed according to a preset traversing cycle to perform retry pushing on the traversed application pushing messages in turn.

The application pushing messages contained in the failure queue may be traversed according to the preset traversing cycle to perform retry pushing on the application pushing messages in the failure queue. The time interval between two corresponding traversal of the failure queue is the traversing cycle. Every time one application pushing message is traversed, retry pushing may be performed on the application pushing message, that is, the application pushing message can be pushed to the application terminal corresponding to the application address again according to the application address in each application pushing message. If the traversing cycle is configured as 1 minute, the application pushing messages in the failure queue are traversed once every 1 minute.

In S132, it is determined whether the retry pushing of each traversed application pushing message is successful.

In S133, if the retry pushing of the application pushing message is successful, the application pushing message is removed from the failure queue and the application address of the application pushing message is removed from the blacklist.

After retry pushing is performed on each application pushing message, it may be determined whether the retry pushing is successful. If the retry pushing of the application pushing message is successful, it indicates that the pushing of the message is completed and the application pushing message can be removed from the failure queue. If the retry pushing of the application pushing message is successful, it indicates that the application address of the application pushing message has been restored to a normal available application address, and the application address of the application pushing message can be removed from the blacklist at the same time.

In S134, if the retry pushing of the application pushing message fails, the application pushing message is reserved in the failure queue, and the method returns to execute the step of traversing the application pushing messages contained in the failure queue according to the preset traversing cycle.

If the retry pushing of the application pushing message fails, it is necessary to reserve the application pushing message in the failure queue so as to acquire the application pushing message and perform retry pushing again when traversing the failure queue again.

In an embodiment, as shown in FIG. 5, before the step S134, the method further comprises steps S1341 and S1342.

In S1341, it is determined whether a duration of the application pushing message in the failure queue is greater than the lifespan configured in the application pushing message.

If the application pushing message fails to be pushed again, before the application pushing message is reserved, the duration of the application pushing message in the failure queue can also be acquired. The duration of the application pushing message is the duration between the time when the application pushing message is added into the failure queue and the current time, and it may be determined whether the duration of the application pushing message is greater than the configured lifespan thereof.

In S1342, if the duration of the application pushing message is greater than the lifespan, the application pushing message is discarded. If the duration of the application pushing message is no more than the lifespan, the step of reserving the application pushing message in the failure queue is executed.

If the duration of the application pushing message is greater than the lifespan, it indicates that the application pushing message cannot be pushed successfully after retry pushing for multiple times, and the application pushing message needs to be discarded to release system resources. If the duration of the application pushing message is no more than the lifespan, the application pushing message can be continuously reserved in the failure queue to perform retry pushing on the application pushing message again.

For example, if the lifespan of the application pushing message is configured to be 10 minutes, and the traversing cycle of the failure queue is 1 minute, the duration of the application pushing message will be greater than the lifespan when the 11th traversal is performed on the failure queue, and the application pushing message may be discarded in this case.

In S140, an application address of the application pushing message that fails to be pushed is added into a preset blacklist.

The application address of the application pushing message that fails to be pushed is added into the preset blacklist. If the application pushing message in the normal queue fails to be pushed, the application address of the application pushing message that fails to be pushed may be added into the blacklist, that is, the application address contained in the blacklist is updated, and the application address of the subsequent application pushing message may be determined based on the application address contained in the blacklist in the subsequent processing.

In S150, if the pushing result of the application pushing message indicates a successful pushing, an application address of the application pushing message that is pushed successfully is removed from the blacklist.

If the pushing result of the application pushing message indicates a successful pushing, the application address of the application pushing message that is pushed successfully is removed from the blacklist. If the application pushing message in the normal queue is pushed successfully, it indicates that the application address of the application pushing message is a normally available application address, and it may be determined whether the application address of the application pushing message that is pushed successfully is contained in the blacklist, and if yes, the application address of the application pushing message is removed from the blacklist.

In the data information pushing method based on an Internet of Things platform provided by the embodiments of the present disclosure, the application pushing message is configured according to the application address list and data information to be pushed that comes from the Internet of Things terminal, and the application pushing message is added into the normal queue for message pushing. If the pushing result of the message pushing indicates a failed pushing, the application pushing message that fails to be pushed is added into the failure queue for retry pushing, and the application address of the application pushing message that fails to be pushed is added into the blacklist. If the pushing result of the message pushing indicates a successful pushing, the application address of the application pushing message that is pushed successfully is removed from the blacklist. Through the method above, the normal queue and the failure queue may be configured to separately pushing application pushing messages for normal and abnormal application addresses, avoiding disruption to the normal pushing process by the abnormal application addresses. The lifespan is configured to control a retry pushing frequency for the application pushing messages in the failure queue, avoiding excessive retry pushing in a short period of time, which greatly reduces occupation of system resources.

The embodiments of the present disclosure further provide a data information pushing apparatus based on an Internet of Things platform, wherein the apparatus is applied to a management server, the management server establishes a network connection with an Internet of Things terminal and a plurality of application terminals to realize wireless transmission of data information, and each application terminal corresponds to one application address. The data information pushing apparatus based on the Internet of Things platform is configured for executing any example of the data information pushing method based on an Internet of Things platform mentioned above. Specifically, referring to FIG. 7, FIG. 7 is a schematic block diagram of the data information pushing apparatus based on the Internet of Things platform provided by the embodiments of the present disclosure.

Figure 7:
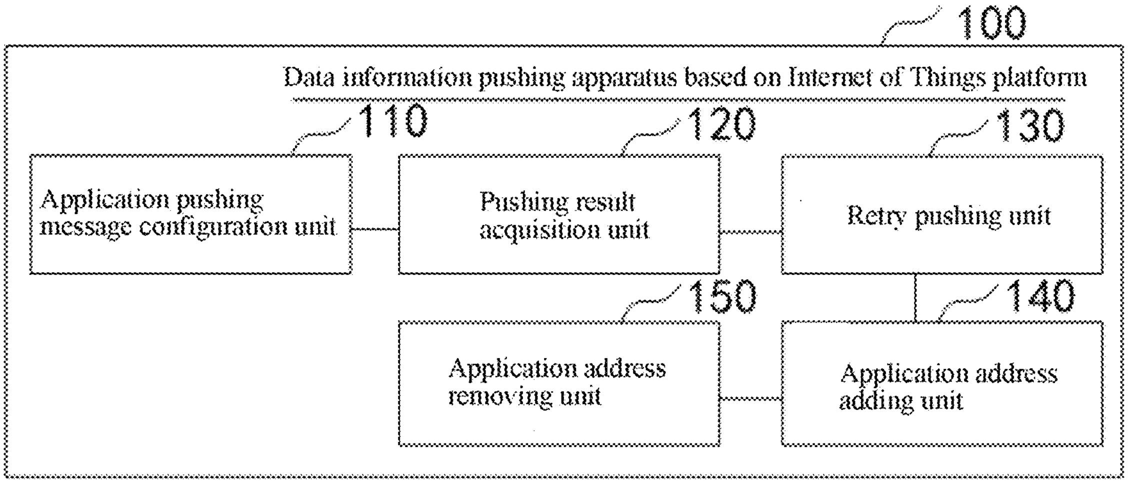
FIG. 7 is a schematic block diagram of a data information pushing apparatus based on an Internet of Things platform provided by the embodiments of the present disclosure.

As shown in FIG. 7, the data information pushing apparatus 100 based on the Internet of Things platform comprises an application pushing message configuration unit 110, a pushing result acquisition unit 120, a retry pushing unit 130, an application address adding unit 140 and an application address removing unit 150.

The application pushing message configuration 110 is configured for, if data information to be pushed from the Internet of Things terminal is received, configuring an application pushing message corresponding to the data information to be pushed according to a pre-stored application address list.

The pushing result acquisition unit 120 is configured for adding the application pushing message to a preset normal queue for message pushing, and acquiring a pushing result of each application pushing message.

In a specific embodiment, the data information pushing apparatus 100 based on the Internet of Things platform further comprises an application address determination unit configured for determining whether the application address of each application pushing message is contained in the blacklist; and if the application address of the application pushing message is not contained in the blacklist, executing the step executed in the pushing result acquisition unit.

In a specific embodiment, the data information pushing apparatus 100 based on the Internet of Things platform further comprises a time interval determination unit configured for, if the application address of the application pushing message is contained in the blacklist, determining whether a time interval between a current time and a last failed pushing time of the application address is greater than a preset time threshold, wherein the last failed pushing time is the most recent time when pushing of the application pushing message to the application address fails; if the time interval between the current time and the last failed pushing time is greater than the time threshold, executing the step executed in the pushing result acquisition unit; and a message adding unit configured for, if the time interval between the current time and the last failed pushing time is no more than the time threshold, adding the application pushing message into the failure queue.

The retry pushing unit 130 is configured for, if the pushing result of the application pushing message indicates a failed pushing, adding the application pushing message that fails to be pushed into a preset failure queue for retry pushing.

In a specific embodiment, the retry pushing unit 130 comprises a pushing message traversing unit configured for traversing the application pushing messages contained in the failure queue according to a preset traversing cycle to perform retry pushing on the traversed application pushing messages in turn; a retry pushing determination unit configured for determining whether the retry pushing of each traversed application pushing message is successful; a removing unit configured for, if the retry pushing of the application pushing message is successful, removing the application pushing message from the failure queue and removing the application address of the application pushing message from the blacklist; and an application pushing message reserving unit configured for, if the retry pushing of the application pushing message fails, reserving the application pushing message in the failure queue, and returning to execute the step of traversing the application pushing messages contained in the failure queue according to the preset traversing cycle.

In a specific embodiment, the retry pushing unit 130 further comprises a duration determination unit configured for determining whether a duration of the application pushing message in the failure queue is greater than the lifespan configured in the application pushing message; an application pushing message discarding unit configured for, if the duration of the application pushing message is greater than the lifespan, discarding the application pushing message; and if the duration of the application pushing message is no more than the lifespan, executing the step executed in the application pushing message reserving unit.

The application address adding unit 140 is configured for adding an application address of the application pushing message that fails to be pushed into a preset blacklist.

The application address removing unit 150 is configured for, if the pushing result of the application pushing message indicates a successful pushing, removing an application address of the application pushing message that is pushed successfully from the blacklist.

The data information pushing method based on an Internet of Things platform above is applied in the data information pushing apparatus based on the Internet of Things platform in the embodiments of the present disclosure. The application pushing message is configured according to the application address list and data information to be pushed that comes from the Internet of Things terminal, and the application pushing message is added into the normal queue for message pushing. If the pushing result of the message pushing indicates a failed pushing, the application pushing message that fails to be pushed is added into the failure queue for retry pushing, and the application address of the application pushing message that fails to be pushed is added into the blacklist. If the pushing result of the message pushing indicates a successful pushing, the application address of the application pushing message that is pushed successfully is removed from the blacklist. Through the method above, the normal queue and the failure queue may be configured to separately pushing application pushing messages for normal and abnormal application addresses, avoiding disruption to the normal pushing process by the abnormal application addresses. The lifespan is configured to control a retry pushing frequency for the application pushing messages in the failure queue, avoiding excessive retry pushing in a short period of time, which greatly reduces occupation of system resources.

Figure 8:
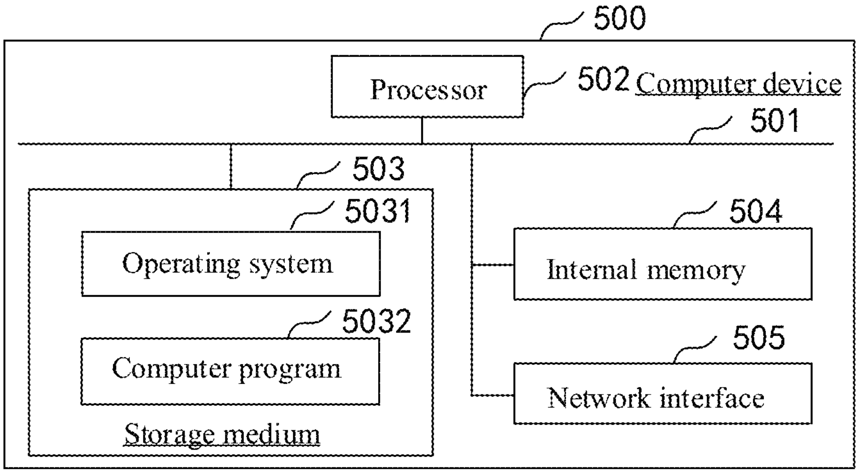
FIG. 8 is a schematic block diagram of a computer device provided by the embodiments of the present disclosure.

The data information pushing apparatus based on the Internet of Things platform may be implemented in the form of a computer program which can be run on a computer device as shown in FIG. 8.

FIG. 8 is a schematic block diagram of the computer device provided by the embodiments of the present disclosure. The computer device may be a management server for executing a data information pushing method based on an Internet of Things platform to push a message to be pushed to a corresponding application terminal.

Referring to FIG. 8, the computer device 500 includes a processor 502, a memory, and a network interface 505 connected through a system bus 501, wherein the memory may include a storage medium 503 and an internal memory 504.

The storage medium 503 may store an operating system 5031 and a computer program 5032. The computer program 5032, when being executed, may cause the processor 502 to execute the data information pushing method based on an Internet of Things platform, wherein the storage medium 503 may be a volatile storage medium or a non-volatile storage medium.

The processor 502 is configured to provide computing and control capabilities to support the operation of the entire computer device 500.

The internal memory 504 provides an environment for the operating of the computer program 5032 in the storage medium 503, and the computer program 5032, when being executed by the processor 502, may cause the processor 502 to execute the data information pushing method based on an Internet of Things platform.

The network interface 505 is configured to perform network communication to provide transmission of data information, and the network communication is a wired network communication and/or a wireless network communication. Those of ordinary skills in the art can understand that the structure shown in FIG. 8 is only a block diagram of some structures related to the solutions of the present disclosure and does not constitute a limitation on the computer device 500 to which the solutions of the present disclosure is applied. The specific computer device 500 may include more or fewer components than those shown in the figure, or may combine some components, or have different component arrangements.

The processor 502 is configured to run the computer program 5032 stored in the memory, to implement corresponding functions in the data information pushing method based on an Internet of Things platform above.

Those of ordinary skills in the art can understand that the embodiment of the computer device shown in FIG. 8 does not constitute a limitation on the specific composition of the computer device, and in other embodiments, the computer device may include more or fewer components than those shown in the figure, or combine some components, or have different component arrangements. For example, in some embodiments, the computer device may include only a memory and a processor, and in such an embodiment, the structure and function of the memory and the processor are consistent with the embodiment shown in FIG. 8, and details are not described herein again.

It should be understood that in the embodiments of the present disclosure, the processor 502 may be Central Processing Unit (CPU). The processor 502 may also be other general-purpose processor, a Digital Signal Processor (DSP), an Application Specific Integrated Circuit (ASIC), a Field-Programmable Gate Array (FPGA) or other programmable logic device, discrete gate or transistor logic device, and discrete hardware component. The general-purpose processor may be a microprocessor or the processor may be any conventional processor, or the like.

In another embodiment of the present disclosure, a computer-readable storage medium is provided. The computer-readable storage medium may be a volatile or non-volatile computer-readable storage medium. The computer-readable storage medium stores a first computer program, a second computer program, or a third computer program, and when the first computer program is executed by a first processor, the second computer program is executed by a second processor, and the third computer program is executed by a third processor, the steps included in the data information pushing method based on an Internet of Things platform are jointly implemented.

It can be clearly understood by those of ordinary skills in the art that, for the sake of convenience and brevity, the detailed working processes of the foregoing device, apparatus, and units may refer to the corresponding processes in the foregoing method embodiments, and will not be elaborated herein. Those of ordinary skills in the art may realize that the exemplary units and algorithm steps described in connection with the embodiments disclosed herein can be implemented in electronic hardware, computer software or a combination thereof. To clearly explain the interchangeability of hardware and software, the components and steps of each example have been generally described according to functions in the above description. Whether the functions are executed by hardware or software depends on particular applications and design constraint conditions of the technical solutions. Those of ordinary skills in the art may use different methods to implement the described functions for each particular application, but it should not be considered that the implementation goes beyond the scope of the present disclosure.

In the several embodiments provided in the present disclosure, it should be understood that the disclosed devices, apparatuses and methods may be implemented in other ways. The apparatus embodiments described above are merely illustrative. For example, the division of the units is only a logical function division. In practice, there may be other division manners, and units having the same function may also be integrated into one unit, for example, a plurality of units or components may be combined or may be integrated into another system, or some features may be ignored or not performed. In addition, the illustrated or discussed mutual coupling or communication connection may be direct coupling or communication connection, or indirect coupling or communication connection through some interfaces, apparatuses or units, and may be in electrical, mechanical or other forms.

The units described as separate parts may or may not be physically separated, and parts shown as units may or may not be physical units, may be located in one position, or may be distributed over a plurality of network units. Some or all of the units may be selected according to actual needs to achieve the objectives of the solutions of the embodiments of the present disclosure.

In addition, the functional units in the embodiments of the present disclosure may be integrated in one processing unit, or each unit may exist alone physically, or two or more units may be integrated in one unit. The integrated units above may be implemented in the form of hardware, or in the form of software functional units.

The integrated units may also be stored in a computer-readable storage medium if being implemented in the form of a software function module, and sold or used as an independent product. Based on such understanding, the essence of the technical solutions in the present disclosure, or the part contributing to the existing technology, or all or part of the technical solutions, may be embodied in the form of a software product. The computer software product is stored in a computer-readable storage medium, including a number of instructions such that one computer device (which may be a personal computer, a server, or a network device, etc.) executes all or part of the steps in the methods described in various embodiments of the present disclosure. The foregoing computer-readable storage medium includes: any medium that can store program code, such as a USB flash drive, a removable hard disk, a read-only memory (ROM), a magnetic disk, or an optical disk.

The foregoing description involves merely some embodiments of the present disclosure, but the protection scope of the present disclosure is not limited thereto. Any person of ordinary skill in the art can easily contemplate changes or substitutions within the technical scope of the present disclosure, and all the changes or substitutions should all fall within the protection scope of the present disclosure. Therefore, the protection scope of the present disclosure shall be subjected to the protection scope of the claims.

What is claimed is:

1. A data information pushing method based on an Internet of Things platform, applied to a management server establishing a network connection with an Internet of Things terminal and a plurality of application terminals to realize wireless transmission of data information, each of the plurality of application terminals corresponding to a respective one of application addresses, wherein the method comprises:

in response to data information to be pushed from the Internet of Things terminal being received, configuring an application pushing message corresponding to the data information to be pushed according to a pre-stored application address list;

adding the application pushing message to a preset normal queue for message pushing, and acquiring a pushing result of each application pushing message;

in response to the pushing result of the application pushing message indicating a failed pushing, adding the application pushing message that fails to be pushed into a preset failure queue for retry pushing, wherein each application pushing message added into the failure queue is configured with a lifespan;

adding an application address of the application pushing message that fails to be pushed into a preset blacklist; and in response to the pushing result of the application pushing message indicating a successful pushing, removing the application address of the application pushing message that is pushed successfully from the blacklist;

wherein before adding the application pushing message to the preset normal queue for message pushing, the method further comprises:

determining whether the application address of each application pushing message is contained in the blacklist; and in response to the application address of the application pushing message being not contained in the blacklist, adding the application pushing message into the preset normal queue for message pushing;

wherein after the determining whether the application address of the application pushing message is contained in the blacklist, the method further comprises:

in response to the application address of the application pushing message being contained in the blacklist, determining whether a time interval between a current time and a last failed pushing time of the application address is greater than a preset time threshold, wherein the last failed pushing time is the most recent time when pushing of the application pushing message to the application address fails;

in response to the time interval between the current time and the last failed pushing time being greater than the preset time threshold, adding the application pushing message into the preset normal queue for message pushing; and in response to the time interval between the current time and the last failed pushing time being no more than the preset time threshold, adding the application pushing message into the failure queue.

2. The data information pushing method based on an Internet of Things platform according to claim 1, wherein adding the application pushing message that fails to be pushed into the preset failure queue for retry pushing comprises:

traversing the application pushing messages contained in the failure queue according to a preset traversing cycle to perform retry pushing on the traversed application pushing messages in turn;

determining whether the retry pushing of each traversed application pushing message is successful;

in response to the retry pushing of the application pushing message being successful, removing the application pushing message from the failure queue and removing the application address of the application pushing message from the blacklist; and in response to the retry pushing of the application pushing message failing, reserving the application pushing message in the failure queue, and traversing the application pushing messages contained in the failure queue according to the preset traversing cycle.

3. The data information pushing method based on an Internet of Things platform according to claim 2, wherein before reserving the application pushing message in the failure queue, the method further comprises:

determining whether a duration of the application pushing message in the failure queue is greater than the lifespan configured in the application pushing message;

in response to the duration of the application pushing message being greater than the lifespan, discarding the application pushing message; and in response to the duration of the application pushing message being no more than the lifespan, reserving the application pushing message in the failure queue.

4. A data information pushing apparatus based on an Internet of Things platform, applied to a management server establishing a network connection with an Internet of Things terminal and a plurality of application terminals to realize wireless transmission of data information, and each of the plurality of application terminals corresponding to a respective one of application addresses, wherein the apparatus comprises:

an application pushing message configuration unit configured for, in response to data information to be pushed from the Internet of Things terminal being received, configuring an application pushing message corresponding to the data information to be pushed according to a pre-stored application address list;

a pushing result acquisition unit configured for adding the application pushing message to a preset normal queue for message pushing, and acquiring a pushing result of each application pushing message;

a retry pushing unit configured for, in response to the pushing result of the application pushing message indicating a failed pushing, adding the application pushing message that fails to be pushed into a preset failure queue for retry pushing;

an application address adding unit configured for adding an application address of the application pushing message that fails to be pushed into a preset blacklist; an application address removing unit configured for, in response to the pushing result of the application pushing message indicating a successful pushing, removing the application address of the application pushing message that is pushed successfully from the blacklist;

an application address determination unit configured for:

determining whether the application address of each application pushing message is contained in the blacklist; and in response to the application address of the application pushing message being not contained in the blacklist, executing the step executed in the pushing result acquisition unit; and a time interval determination unit configured for:

in response to the application address of the application pushing message being contained in the blacklist, determining whether a time interval between a current time and a last failed pushing time of the application address is greater than a preset time threshold, wherein the last failed pushing time is the most recent time when pushing of the application pushing message to the application address fails;

in response to the time interval between the current time and the last failed pushing time being greater than the time threshold, executing the step executed in the pushing result acquisition unit; and a message adding unit configured for, in response to the time interval between the current time and the last failed pushing time being no more than the time threshold, adding the application pushing message into the failure queue.

5. A computer device, comprising a memory, a processor, and a computer program stored in the memory and executable on the processor, wherein the computer program, when executed by the processor, causes the processor to implement the data information pushing method based on an Internet of Things platform according to claim 1.

6. A non-transitory computer-readable storage medium, wherein the computer-readable storage medium stores a computer program which, when executed by a processor, causes the processor to implement the data information pushing method based on an Internet of Things platform according to claim 1.

* * * * *